US010234069B2

(12) United States Patent
Kulprathipanja et al.

(10) Patent No.: US 10,234,069 B2
(45) Date of Patent: Mar. 19, 2019

(54) HIGH TEMPERATURE FLEXIBLE BLANKET FOR INDUSTRIAL INSULATION APPLICATIONS

(71) Applicant: JOHNS MANVILLE, Denver, CO (US)

(72) Inventors: Ames Kulprathipanja, Broomfield, CO (US); John Bittner, Conifer, CO (US)

(73) Assignee: Johns Manville, Denver, CO (US)

( * ) Notice: Subject to any disclaimer, the term of this patent is extended or adjusted under 35 U.S.C. 154(b) by 796 days.

(21) Appl. No.: 14/642,492

(22) Filed: Mar. 9, 2015

(65) Prior Publication Data
US 2016/0265709 A1    Sep. 15, 2016

(51) Int. Cl.
F16L 59/02    (2006.01)
B32B 37/24    (2006.01)
B32B 38/00    (2006.01)
B32B 17/00    (2006.01)
B32B 5/16     (2006.01)
B32B 27/12    (2006.01)
F16L 59/04    (2006.01)

(52) U.S. Cl.
CPC ............ F16L 59/029 (2013.01); B32B 5/16 (2013.01); B32B 17/00 (2013.01); B32B 27/12 (2013.01); B32B 37/24 (2013.01); B32B 38/0004 (2013.01); F16L 59/026 (2013.01); F16L 59/04 (2013.01); B32B 2250/03 (2013.01); B32B 2262/101 (2013.01); B32B 2264/102 (2013.01); B32B 2307/304 (2013.01); B32B 2310/0843 (2013.01); B32B 2571/00 (2013.01)

(58) Field of Classification Search
CPC ..................................................... B32B 17/00
See application file for complete search history.

(56) References Cited

U.S. PATENT DOCUMENTS

2003/0060107 A1    3/2003  Gooliak
2008/0166937 A1*   7/2008  Garvey ................... B32B 27/10
                                                        442/1

OTHER PUBLICATIONS

"Silica," Ullman's Encyclopedia of Industrial Chemistry, John Wiley and Sons, 2012.*
Database WPI, Week 198518, Thomson Scientific, AN 1985-108498, XP002759487, London, Great Britain.
Database WPI, Week 201319, Thomson Scientific, AN 2013-D19087 XP002759488, London, Great Britain.

* cited by examiner

Primary Examiner — Ian A Rummel
(74) Attorney, Agent, or Firm — Robert D. Touslee

(57) ABSTRACT

According to one embodiment, an insulation blanket for insulating a structure includes a first facer layer and a second facer layer. A plurality of intermeshed non-woven glass fibers are disposed between the first and second facer layers and a fumed silica insulating powder is also disposed between the first and second facer layers. The fumed silica insulating powder has an average particle size of between about 2 and 20 nanometers. The insulation blanket includes at least one exposed edge having a cauterized face that forms a barrier on the exposed edge to encase the fumed silica insulating powder within the interior of the insulation blanket, which minimizes degradation of the insulating value due to loss or shedding of the fumed silica insulating powder through the exposed edge. The cauterized edge has a depth of cauterized material of between about 0.05 mm and 3 mm.

13 Claims, 3 Drawing Sheets

HIGH TEMPERATURE FLEXIBLE BLANKET FOR INDUSTRIAL INSULATION APPLICATIONS

BACKGROUND

Insulation blankets are often used in industrial applications to insulate various objects, such as pipes, elbows, fittings, and the like. Such insulation blankets may include small particles that increase the insulation R-value of the blanket. In forming or modifying the insulation blanket for application on or around a particular object, the insulation blanket is often cut. When the insulation blanket is cut, the cut edge may expose the small insulation particles to the environment. Due to the small size of the insulation particles, the particles may be shed or lost from within the insulation blanket by falling or escaping out of the cut edge. The loss of the insulation particles may decrease the insulating performance of the blanket, especially at or near the cut edge.

BRIEF SUMMARY

In some instances it may be desired to encase or seal insulating particles or other materials within an insulation blanket. According to one aspect, an insulation blanket for insulating a structure is described herein. The insulation blanket includes a first facer layer and a second facer layer. A plurality of intermeshed non-woven glass fibers are disposed between the first and second facer layers. A fumed silica insulating powder is also disposed between the first and second facer layers and within the intermeshed non-woven glass fibers. The fumed silica insulating powder has an average particle size of between about 2 and 20 nanometers.

The insulation blanket includes at least one exposed edge that includes a cauterized face that is roughly orthogonal to the first and second facer layers. The cauterized face forms a barrier on the exposed edge that encases the fumed silica insulating powder within the interior of the insulation blanket, thereby minimizing degradation of the insulating value due to loss or shedding of the fumed silica insulating powder through the exposed edge. The cauterized edge has a depth of cauterized material of between about 0.05 and 3 mm.

According to another aspect, an insulation blanket for insulating a structure is described herein. The insulation blanket includes a plurality of intermeshed non-woven fibers that are disposed between a first facer and a second facer. The insulation blanket also includes a fine insulating powder that is disposed between the first and second facers and within the intermeshed non-woven fibers. The fine insulating powder has an average particle size of between 2 and 20 nanometers. The insulation blanket further includes at least one exposed edge that has a cauterized face that forms a barrier on the exposed edge to encase the fine insulating powder within the interior of the insulation blanket, thereby minimizing loss of the fine insulating powder through the exposed edge. The exposed edge has a depth of cauterized material of between about 0.05 and 3 mm.

According to another aspect, a method of forming an insulation blanket is described herein. The method includes positioning a plurality of intermeshed non-woven fibers between a first facer layer and a second facer layer. The method also includes positioning a fine insulating powder between the first and second facer layers and within the intermeshed non-woven fibers. The fine insulating powder has an average particle size of between about 2 and 300 nanometers. In a specific embodiment, the fine insulating powder has an average particle size of between about 2 and 20 nanometers. The method further includes cauterizing an exposed edge of the insulation blanket to form a barrier on the exposed edge that encases the fine insulating powder within the interior of the insulation blanket. The cauterized edge has a depth of cauterized material of between about 0.05 and 3 mm.

In some embodiments, the method additionally includes compressing the insulation blanket prior to cauterizing the exposed edge. Compressing the insulation blanket may improve the cauterization process by rendering the blanket's thickness and/or density more consistent and/or uniform. In other embodiments, the insulation blanket may not be compressed prior to cauterizing the exposed edge.

BRIEF DESCRIPTION OF THE DRAWINGS

The present technology is described in conjunction with the appended figures.

Figure 1:
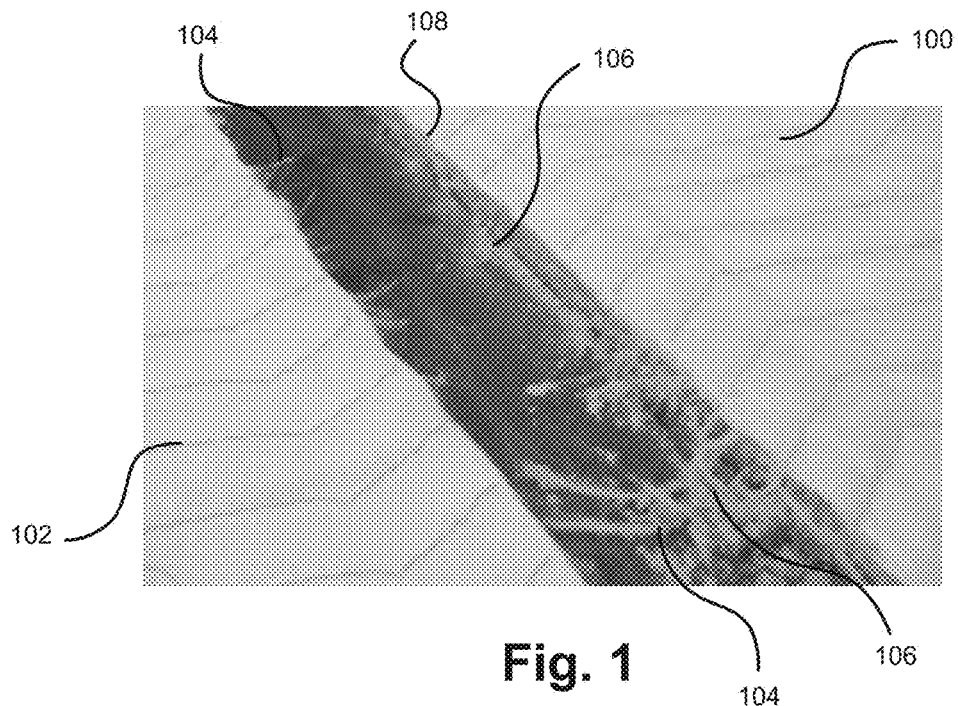
FIG. 1 illustrates a cut edge of an insulation blanket.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The embodiments described herein relate to sealing of one or more edges of a microporous insulation blanket. The edges of the insulation blanket may be sealed to prevent loss or shedding or insulation material that is positioned within the interior of the blanket. For example, insulation blankets may employ small particles that increase the insulation R-value of the blanket. A commonly used insulation particle is fumed silica that is positioned within the insulation blanket's interior. When an edge of the insulation blanket is cut, such as to appropriately size the blanket for application to a fitting, pipe, or other component, the cut edge may expose the insulation particles to the environment. Due to the small size of the insulation particles, the particles may be shed or lost by falling or escaping out of the cut edge. The loss of the insulation particles may decrease the insulating performance of the blanket, especially at or near the cut edge.

To counteract the loss or shedding of the insulation material, the cut edge of conventional blankets may be sealed using an adhesive tape. In such instances, the tape is routed along the cut edge to cover and conceal the edge, thereby minimizing loss, fall-out, dust, or shedding of the insulation particles through the cut edge. The tape may provide a satisfactory seal, but is relatively slow typically requiring the use of specialty tapes and a careful application. When multiple edges of the insulation blanket are cut, the need to tape each edge may delay the application of the insulation blanket to the component that is to be insulated.

In other instances, an adhesive spray material may be applied to the cut edge subsequent to the edge being cut. The applied spray adhesive, however, may not form a barrier that is sufficient to prevent the loss or shedding of the insulation particles through the cut edge. For example, as the insulation blanket is bent or flexed around various round objects or corners, large gaps may form between adhered portions of the cut edge. The insulation particles may be lost or shed through the large gaps that are formed. Further, while the spray adhesive is typically quicker to apply than the tape, the application of the spray adhesive still requires an additional step that the installer must perform prior to application of the insulation blanket.

In the instant embodiments, the edge of the insulation blanket may be sufficiently sealed without the application of either an adhesive tape or an adhesive spray. Rather, the edge of the insulation blanket is sufficiently sealed via the application of heat to create an effective barrier to prevent or minimize loss or shedding of the insulation particles. The application of heat to the cut edge cauterizes or sears the edge of the insulation blanket to create the barrier. In many embodiments, the edge of the insulation blanket may be cauterized simultaneous with the edge being cut. For example, a sufficiently hot laser may be used to simultaneously cut and cauterize the edge of the blanket. In most embodiments, the edge of the insulation blanket is mostly, but not fully, cauterized to enable the blanket to flex and bend subsequent to cauterization without breaking or compromising the cauterized edge. In some embodiments, the material of the edge may be cauterized in a layering pattern to minimize loss or shedding of the insulation particles.

The insulation blankets described herein are often fabricated and installed on fittings and specialized shapes for industrial insulation applications, such as oil production, refining, petrochemical, power and other industrial applications. The cauterized cut edge, which may have a layered pattern, allows for the insulation blanket to remain flexible at the cut edge while minimizing fall-out, loss, shedding, or dust from the cut edge. As described herein, the insulation blanket may be composed of fine insulation powders (e.g., fumed silica) that is layered between facers, such as a woven glass matt cloth, non-woven polyester cloth, PE foil, aluminum foil, mica sheet, and the like. Non-woven fibers are also disposed between the facers to prevent excessive movement of the insulation powder within the layers of material. When the insulation blanket is cut to fit a particular application, the insulation powder may fall out or shed from the cut edge and thereby reduce the thermal performance of the product. In addition, the lost insulation material may be a nuisance dust to the installer.

In one embodiment, the insulation blanket comprises between 10% and 80% by weight of the insulation powder or particles (e.g., fumed silica) and between 5% and 50% by weight of the nonwoven fibers (e.g., glass fibers). The insulation powder or particles (e.g., fumed silica) provide a significant portion of the insulation properties of the blanket and, thus, the use of greater than 50% by weight of these material is more common. The insulation blanket may also include other materials, such as between 10% and 50% by weight of Titanium dioxide; between 0 and 30% by weight of Aluminum dioxide; between 5% and 50% by weight of Silicon Carbide; between 5% and 50% by weight of Magnesium silicate; and the like. In many embodiments, the insulation blanket is free of a binder material. Rather, the nonwoven fibers disposed within the interior of the insulation blanket form a mesh of entangled fibers that function to entrap and maintain the insulation powder or particles from migrating within the insulation blanket.

In some embodiments, the insulation powder or particles may have a particle size of between about 2 and 5000 nm. In an exemplary embodiment, the insulation powder or particles are fumed silica. The fumed silica may be composed of submicron-sized spheres, which may be fused into short chains that are typically highly branched. The fumed silica may have a particle size of between about 2 and 300 nanometers, although a particle size of between 4 and 100 nanometers is more common, and a particle size of between 4 and 20 nanometers is most common. In an exemplary embodiment, the nonwoven fibers may be glass fibers. An example of a microporous insulation blanket similar to those described herein is sold under the tradename InsulThin™ HT by Industrial Insulation Group, LLC, a Johns Manville Company.

As described above, to form a barrier on one or more cut edges of the insulation blanket, the edges can be cauterized, preferably in a layering pattern. The formed barrier helps minimize any potential thermal losses and dust nuisance to the installer. The process includes fusing the internal material of the insulation blanket (e.g., nonwoven glass fibers, fumed silica, and the like) to form a closed edge at high temperatures. The cauterization pattern, such as the layered pattern, allows the insulation blanket to remain flexible. In an exemplary embodiment, a high temperature laser can be used to cauterize the edge of the insulation blanket and at the same time cut the insulation blanket into a desired shape, such as to accommodate various elbows, tees, and specialty shapes for industrial applications. Cauterizing the insulation blanket minimizes material fall-out and allows ease of installation and maximum thermal performance of the insulation.

According to one embodiment, an insulation blanket for insulating a structure includes a first facer layer, a second facer layer, and a plurality of intermeshed non-woven glass fibers that are disposed between the first and second facer layers. In some embodiments, the first facer or the second facer and commonly both facer layer is a woven glass mat facer. A fumed silica insulating powder is also disposed between the first and second facer layers and within the intermeshed non-woven glass fibers. As described above, the fumed silica insulating powder may have an average particle size of between about 2 and 300 nanometers, although a particle size of between 4 and 100 nanometers is more common, and a particle size of between 4 and 20 nanometers is most common.

The insulation blanket includes at least one exposed edge that has a cauterized face. In some embodiments, the insulation blanket may include two or three exposed edges or the entire perimeter of the insulation blanket may have exposed edges. The exposed edge(s) may be roughly orthogonal to the first and second facer layers. The cauterized face forms a barrier on the exposed edge(s) that encases the fumed silica insulating powder within the interior of the insulation blanket thereby minimizing degradation of the insulating value due to loss or shedding of the fumed silica insulating powder through the exposed edge. The cauterized edge may have a depth of cauterized material of between about 0.05 and 3 mm. The cauterized edge inhibits or impedes the fumed silica from falling out, shedding, or otherwise escaping from the interior of the insulation blanket.

In some embodiments, greater than 80% of the exposed edge is cauterized while in other embodiments greater than 90% of the exposed edge is cauterized. In most embodiments, however, less than the entire exposed edge is cauterized, which allows the insulation blanket to remain flexible without significantly degrading the formed cauterization barrier. The cauterized layer is formed via exposure of the edge to heat, which may be provided via a high temperature laser, exposed flame, and the like. The heat is above the glass transition temperature of the glass fibers and/or fumed silica, which causes a majority of the glass fibers and/or fumed silica to transition to a molten state. Upon removal of the heat, the molten glass fibers and/or fumed silica recrystallized about the exposed edge to form the cauterization barrier that encases the fumed silica and/or other materials within the interior of the insulation blanket.

In many embodiments it is important to ensure that less than the entire exposed edge is cauterized, or stated differently recrystallized from a molten glass state. This helps ensure that the formed barrier will not fracture or break as the insulation blanket is bent or flexed around an object or otherwise handled by an installer. Stated differently, if the entire exposed edge is cauterized or recrystallized from a molten glass state, a layer of glass material may be formed across a significant portion of the exposed edge or across the entire exposed edge. If such a layer of glass material is formed, the glass layer may fracture or break due to handling or installation of the blanket.

Rather than forming a glass layer across the exposed layer, the cauterized layer should form multiple smaller glass material segments across or about a face of the exposed edge. The multiple smaller glass material segments function together to essentially form a seal or barrier that encases the fumed silica or other insulation powder positioned within the insulation blanket while allowing the insulation blanket to flex or bend. The multiple smaller glass material segments are able to shift or move relative to one another without fracturing or breaking, which would degrade or compromise the formed barrier. One method of forming such multiple smaller glass material segments is to form a plurality of cauterized layers between the first and second facers. The individual layers function together to encase the fumed silica while being able to shift or move relative to one another without significant or substantial fracturing or breaking.

According to another embodiment, an insulation blanket for insulating a structure includes a plurality of intermeshed non-woven fibers that are disposed between a first facer and a second facer and a fine insulating powder that is also disposed between the first and second facers and within the intermeshed non-woven fibers. The first facer or the second facer, or both, may be a woven glass mat facer. The fine insulating powder has an average particle size of between 2 and 300 nanometers. The fine insulating powder may include fumed silica. The insulation blanket includes at least one exposed edge having a cauterized face that forms a barrier on the exposed edge to encase the fine insulating powder within the interior of the insulation blanket, thereby minimizing loss of the fine insulating powder through the exposed edge. The exposed edge has a depth of cauterized material of between about 0.05 and 3 mm.

The insulation blanket may have at least 80% of the exposed edge, but less than the entire exposed edge, cauterized. In other embodiments, the insulation blanket may have at least 90% of the exposed edge, but less than the entire exposed edge, cauterized. The exposed edge may include a plurality of cauterized layers between the first and second facers. In some embodiments, the insulation blanket includes a plurality of exposed edges that each have a cauterized face that forms a barrier to encase the fine insulating powder within the interior of the insulation blanket.

Having described several embodiments generally, additional aspects will be realized with reference to the description of the several drawings provided below.

Referring now to FIG. 1, illustrated is a microporous insulation blanket 100 (hereinafter microporous blanket or blanket 100). Blanket 100 consist of compressed fumed silica particles 106 and fibers 104 that are encased between two woven mat facers 102. Due to the nature of the microporous blanket 100, cutting the blanket by using a knife, scissors, water jet, and or lasers can sometimes lead to fall-out of the internal fumed silica 106 and/or other particles. For example, when the microporous blanket 100 is cut, a pair of exposed edges 108 are formed along the cut. Since the edge 108 is exposed, the internal fibers 104 may protrude or extend from the exposed edge 108. The fumed silica 106 and/or other particles may also fall-out or escape through the exposed edge 108, which reduces the amount of insulation material within the microporous blanket 100, especially along or near the exposed edge 108.

The fall-out of the insulation material may be particular evident when a dull blade from a knife or scissors is used to cut the blanket. The dull blade may render the exposed edge 108 relatively roughly and/or may pull the fibers 104 and fumed silica 106 and/or other particles from within the interior of the blanket 100. When a sharp knife is used with the proper technique (e.g., proper speed and angle), a cleaner edge 108 is formed with minimal disruption of the particles 106 and fibers 104. The result is a relatively clean edge 108 with minimal fall-out of the particles 106 and fibers 104. However, subsequent handling of the blanket 100, such as movement or bending/flexing of the blanket 100 during installation, may cause the particles 106 and/or fibers 104 to shed or fall-out from the exposed edge 108 of the blanket 100. Accordingly, a slight degradation of the blanket's insulating properties may occur even when a sharp blade and proper technique are used to cut the blanket 100.

Figure 2:
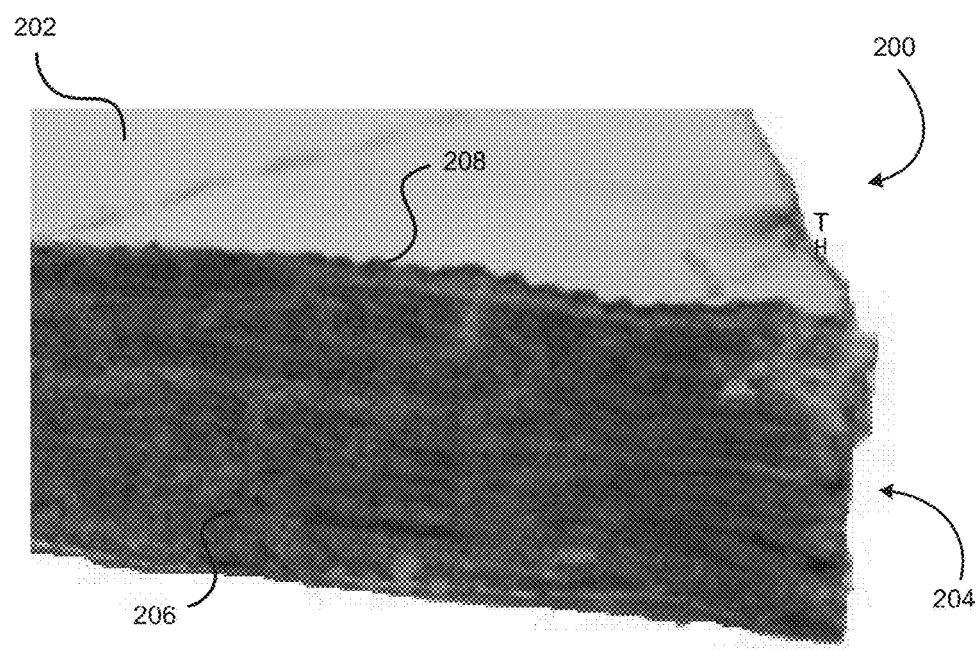
FIG. 2 illustrates an insulation blanket having a cauterized or sealed exposed edge.

Referring now to FIG. 2, illustrated is a microporous insulation blanket 200 (hereinafter microporous blanket or blanket 200) that includes insulation material particles (e.g., compressed fumed silica) and entangled nonwoven fibers (collectively 204) that are encased or positioned between two facers 202. The microporous blanket 200 is cut along at least one edge 208 and in many embodiment along at least two or more edges 208. The cut edges are exposed to the surrounding environment. However, unlike the blanket 100 of FIG. 1, a barrier 206 is formed on the face of the exposed edge(s) 208 to encase or seal the insulation material particles and nonwoven fibers 204 within the microporous blanket 200—specifically, encase or seal the insulation material particles and nonwoven fibers 204 between the two opposing facers 202.

The barrier 206 formed on the face of the exposed edge(s) 208 is a crust or cauterized edge that is formed using high temperatures that fuse the internal material of the microporous blanket 200. Specifically, the high temperatures cause the insulation material particles and/or nonwoven fibers 204, and/or any other materials positioned within the blanket 200, to transition to a molten state. The molten insulation material particles and/or nonwoven fibers 204 than mix to some degree before the high temperatures are removed, which causes the molten insulation material particles and/or nonwoven fibers 204 to recrystallize and form the crust or cauterized edge on the face of the exposed edge 208. The recrystallized internal materials encase and seal the remaining internal materials within the blanket 200, which prevents or minimizes shedding or fall-out of the internal materials during handling and installation of the blanket about an object to be insulated.

Encasing the internal material by forming barrier 206 is especially useful for industrial applications where the microporous blanket 200 is applied to elbows, fittings, and other specialized shapes. In an exemplary embodiment, unique shapes for elbows and other objects can be quickly cut using a high temperature laser, thereby minimizing labor. The use of a high temperature laser simultaneously cauterizes the exposed edges 208 while the blanket 200 is cut to minimize fall-out or shedding of the insulation material particles and/or nonwoven fibers 204. In other embodiments, the exposed edge 208 may be exposed to an open flame for a given amount of time to form the barrier 206.

It is important that a large portion of the exposed edge's face is cauterized to form a sufficient barrier 206. For example, in one embodiment greater than 50% of the face of the exposed edge 208 is cauterized. In another embodiment, greater than 70% of the exposed edge's face is cauterized. In yet other embodiments, greater than 80% or 90% of the exposed edge's face is cauterized. It is equally important to prevent or refrain from cauterizing all of the exposed edge's face to ensure that the exposed edge 208 does not become brittle and fracture or break during handling or installation as described above. As such, in some embodiments, less than or about 95% of the exposed edge's face is cauterized. Some blankets may require an upper cauterization limit of less than or about 90% or 85% of the exposed edge's face. In a specific embodiment, the exposed edge may be cauterized by between 70% and 90% or 95%. In other embodiments, the exposed edge may be cauterized by between 80% and 90% or 95%.

In many embodiments, the face of the exposed edge 208 is heated to form a plurality of discontinuous cauterized portions or segments. The discontinuous cauterized portions or segments allow the barrier 206 to be formed without causing the exposed edge 208 to become brittle. Specifically, the discontinuous cauterized portions or segments are able to move or shift slightly relative to one another without causing significant damage to adjacent cauterized portions or segments. This enables the exposed edge 208 to bend and flex without breaking or fracturing. The discontinuous cauterized portions or segments are formed close enough together so that the discontinuous cauterized portions or segments function cooperatively or synergistically to encase and seal the internal material (e.g., insulation material particles and/or nonwoven fibers 204) within the interior of the microporous blanket 200.

In many instances, the face of the exposed edge 208 has a cauterization thickness T or depth of between about 0.05 mm and 3 mm. In other embodiments, the cauterization thickness T or depth may range between about 0.1 mm and 2 mm. This cauterization thickness T or depth forms a cauterization barrier 206 that is thick enough to withstand cracking or fracturing due to normal handling and installation of the blanket and is thick enough to hold, encase, or seal the internal material within the blanket 200. The cauterization thickness T or depth is also thin enough to form the discontinuous cauterized portions or segments described above. Stated differently, a cauterization thickness T or depth greater than 3 mm may be subject to cracking or fracturing of the formed barrier 206, which may cause cauterized segments to fall off or shed from the face of the exposed edge 208, thereby forming gaps or holes on the exposed edge's face through which the internal material may pass, shed, or otherwise be lost. A cauterization thickness T or depth of greater the 3 mm may also result in unnecessary labor times, thereby increasing the cost of installation of the blanket 200.

Figure 3:
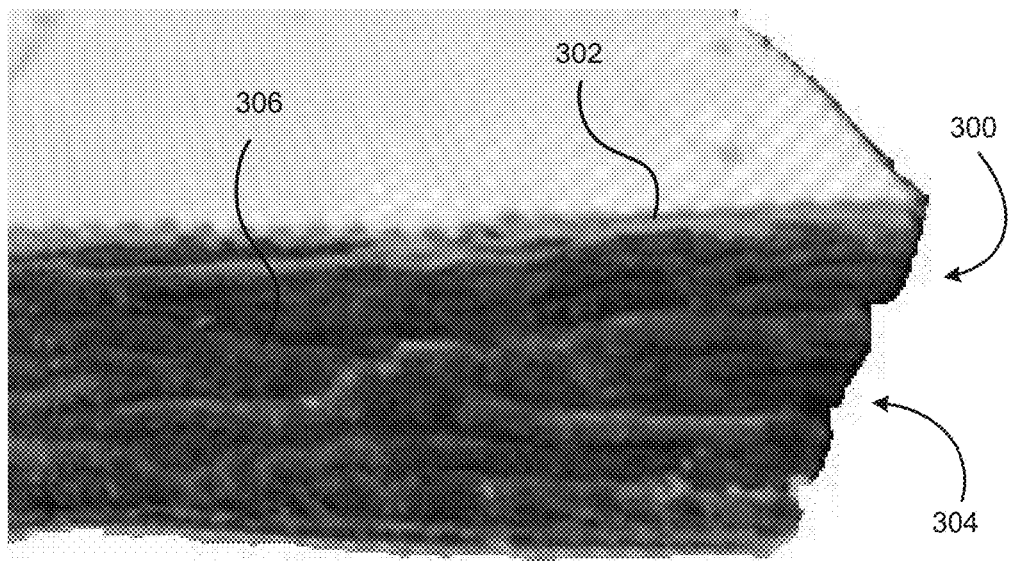
FIG. 3 illustrates a layered configuration of a cauterized edge of an insulation blanket.

Referring now to FIG. 3, illustrated is one method of forming discontinuous cauterized portions or segments on a face 304 of an exposed edge 302 of a microporous blanket 300. In an exemplary embodiment, the discontinuous cauterized portions or segments are formed via cutting of the exposed edge 302 with a high temperature laser. The high temperature laser cuts the exposed edge 302 in a manner that forms a layering pattern 306 on the face 304. The layered pattern 306 minimizes fall-out of the internal materials, which may be ideal for industrial fittings and specialized shapes. The layered pattern 306 also allows the blanket 300 and exposed edge 302 to maintaining flexibility so that the formed barrier is not substantially degraded due to handling and installation of the blanket 300.

The layered pattern 306 of cauterized material is not uniform and does not entirely cover the face 304 of the exposed edge 302. As illustrated, the cauterized portions or segments are discontinuous with some cauterized portions or segments extending roughly horizontal and others extending at an angle or roughly vertical. This configuration allows the formed barrier to move or shift, or even break or fracture to some minor degree, while sufficient sealing or encasing the internal materials within the microporous blanket 300. Accordingly, the blanket 300 may be flexed, handled, and bent without a significant loss of the internal materials. Stated differently, the layered pattern 306 provides stress relief so that the entire cauterization barrier does not fall off when the blanket 300 is flexed, handled, and bent during installation or transportation.

The layered pattern 306 has a cauterization coverage (i.e., amount of the face 304 that is cauterized) of greater than 80% and in many embodiments greater than 90%. The cauterization coverage of the layered patter 306 is also less than 100% and in many embodiments is less than 97% or 95%. This cauterization coverage minimizes fall-out or shedding of the internal materials (i.e., fumed silica and/or glass fibers) at the exposed edges 302 while preventing the face 304 and exposed edge 302 from being too brittle. The high temperature laser that is used to cut the exposed edge 302 and cauterize the face 304 should be controlled during the processing as described below to achieve a sufficient cauterization coverage of the face 304. The processing of the laser may be dependent on the internal microporous composition (e.g., fibers, particles, and the like.).

The layered pattern 306 has a cauterization thickness or depth of between about 0.05 mm and 3 mm and in some embodiments between about 0.1 mm and 2 mm. This cauterization thickness or depth is not too thin, which could cause the formed cauterization barrier to easily crack and break and/or is not too thin to penetrate the face 304 enough to hold, seal, or encase the internal material within the microporous blanket 300. In contrast, the cauterization thickness or depth is not too thick to cause the formed barrier to easily crack and/or flake off from the face 304 of the exposed edge 302 in relatively large pieces, which would form gaps or holes in the face 304 that allow the internal material to shed or be lost from within the microporous blanket 300.

Figure 4:
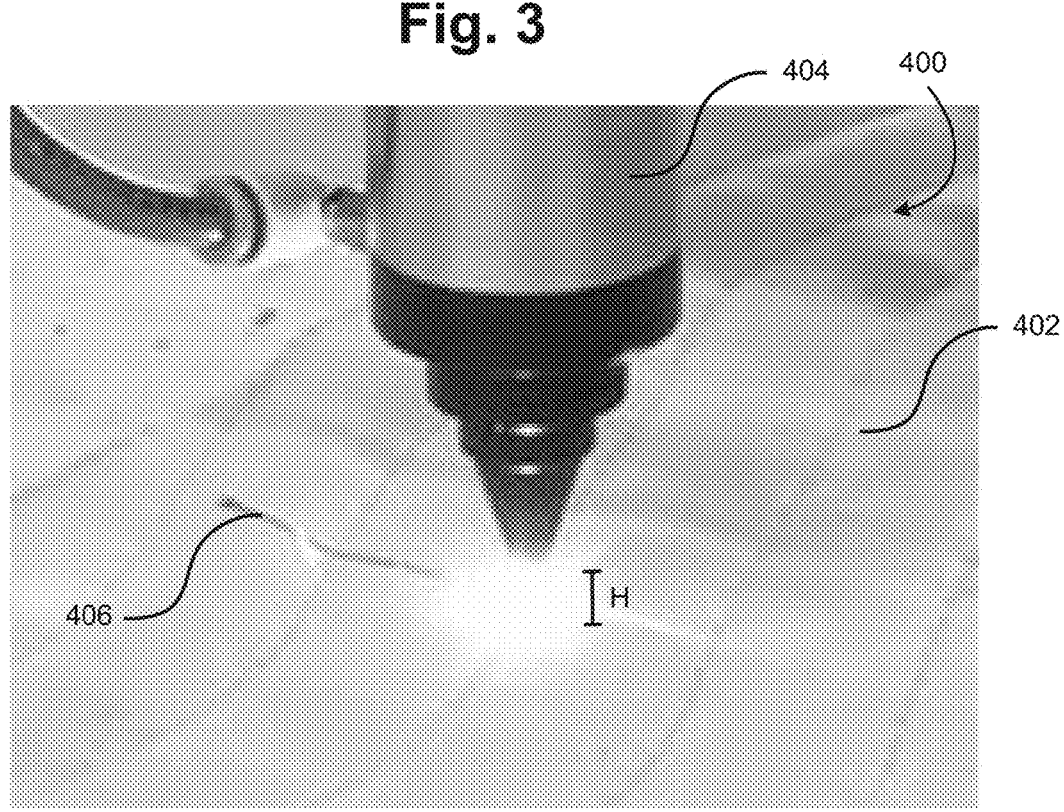
FIG. 4 illustrates a process for cauterizing an edge of an insulation blanket with a laser.

Referring now to FIG. 4, illustrated is a process 400 of cutting an insulation blanket 402 with a high temperature laser 404. The high temperature laser 404 is used to simultaneously cut 406 and cauterize the insulation blanket 402.

To achieve a sufficient cauterization barrier and cauterization coverage as described herein, one or more of the following parameters of the laser 404 need to be controlled: a distance H of laser nozzle to the blanket 402; the laser wattage; the type of laser tip; the speed of laser; and/or the density, compression, and/or hardness of the blanket.

According to one embodiment, to achieve a sufficient cauterization barrier and cauterization coverage as described herein the following laser parameters may be employed. The focal length or distance H of the laser nozzle to the blanket 402 may be between about 2 and 7 inches, although a range of between about 2.5 and 5 inches is more common. A greater focal length is typically better for thicker blankets 402 due to deeper focal penetration, while a lesser focal length may be better for thinner blankets 402. A focal length of about 2.5 may be optimal for a 10 mm thick blanket 402. The laser power or wattage may be between about 150 W and 400 W. A higher power laser may be better due to the higher temperature.

To achieve a proper cauterization thickness as described, the laser or cutting speed normally needs to be associated with the laser power used. For example, lower power laser typically require slower cutting speeds to achieve the sufficient heat to cauterize the exposed edge. The laser speed may be between about 0.01 inches per second (in/s) and 10 inches per second.

Figure 5:
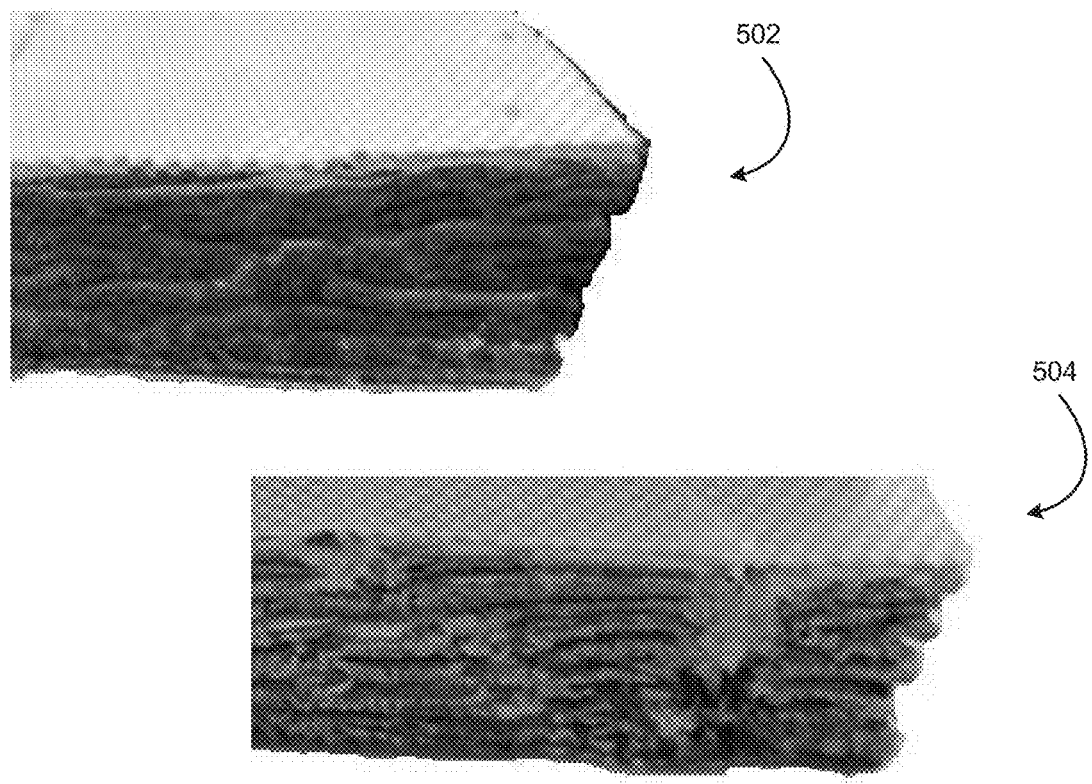
FIG. 5 illustrates a comparison of cauterized edges of two separate insulation blankets.

The use of nitrogen gas as the laser purge gas rather than air or oxygen typically forms a better cauterization face. Stated differently, nitrogen gas provides a more cauterized face of the exposed edge in comparison with air or oxygen. FIG. 5 illustrates the improved cauterization that is achieved using a nitrogen purge gas in comparison with air or oxygen. Specifically, blanket 502 was cauterized using a nitrogen purge gas while blanket 504 was cauterized using an oxygen purge gas. The laser parameters used to cauterize the two blankets were the same other than the purge gas. As shown, the cauterization coverage of blanket 502 is greater than blanket 504, which experienced a more flaky crust layer. A purge gas pressure of between about 15 psi and 40 psi has been shown to achieve an optimal cauterized face. A purge gas pressure of about 15 psi may be optimal for a 10 mm thick blanket 402.

When cutting a corner, the laser power should be maintained at about 50% or greater. This ensures that the laser does not turn off when forming a corner. If the laser power goes below about 50%, a clean cut of the blanket 402 may not be obtained at the corner. A pulse rate of between about 500 pulse per inch and 3,000 pulse per inch may be used in forming the cauterized face. This may be achieved by using a pulse frequency of between about 500 to 50,000. In some embodiments, a pulse frequency of about 20,000 may be ideal. The cauterization process may be further improved by compressing the blanket 402 before cutting the blanket with the laser. Compressing the blanket 402 may improve the consistency or uniformity of the blanket's thickness and/or density, which improves cauterization of the material.

In an exemplary embodiment, a 10 mm thick insulation blanket (i.e., InsulThin HT) was cut using the following laser parameters, which resulted in the formation of a sufficient cauterization barrier and cauterization coverage. A 400 W laser was used to cut the blanket. The cutting speed of the laser was approximately 1 inch per second and the focal length of the laser was approximately 2.5 inches. Nitrogen gas was used as the purge gas at a pressure of approximately 15 psi. The laser had a pulse frequency of approximately 20,000.

It should be realized that the parameters of the above described exemplary embodiment are for illustrative purposes only and that other laser parameters may be used to achieve a sufficient cauterization barrier and cauterization coverage.

Figure 6:
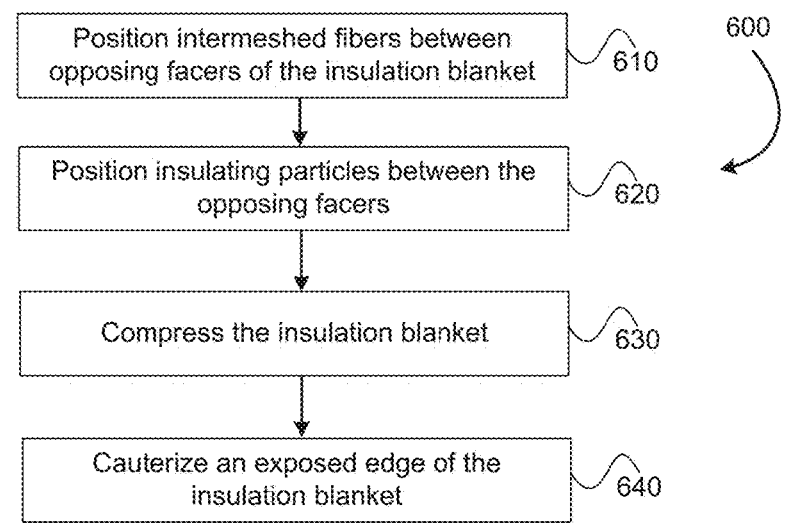
FIG. 6 illustrates a process of forming a cauterized edge on an insulation blanket.

Referring now to FIG. 6, illustrated is a method 600 of forming an insulation blanket. At block 610, a plurality of intermeshed non-woven fibers are positioned between a first facer layer and a second facer layer. In one embodiment, the intermeshed non-woven fibers include glass fibers. At block 620, a fine insulating powder or particles are positioned between the first and second facer layers and within the intermeshed non-woven fibers. The fine insulating powder or particles typically have an average particle size of between about 2 and 300 nanometers. In one embodiment, the fine insulating powder or particles may include fumed silica. In many embodiments, the non-woven fibers and the fine insulating powder or particles are mixed prior to positioning the fibers and particles between the first facer layer and the second facer layer. At block 630, the insulation blanket may optionally be compressed. Compressing the insulation blanket may improve the cauterization process by rendering the blanket's thickness and/or density more consistent and/or uniform. In other embodiments, the insulation blanket may not be compressed and block 630 may not be performed. At block 640, an exposed edge of the insulation blanket is cauterized to form a barrier on the exposed edge that encases or seals the fine insulating powder or particles within the interior of the insulation blanket. The cauterized edge may have a depth of cauterized material of between about 0.05 mm and 3 mm, and in some embodiments between about 0.1 mm and 2 mm.

In some embodiments, cauterizing the exposed edge may include forming a plurality of cauterized layers on a face of the exposed edge. Cauterizing the face of the exposed edge may include cauterizing at least 80% of the exposed edge without cauterizing the entire exposed edge and/or may include cauterizing at least 90% of the exposed edge without cauterizing the entire exposed edge.

In some embodiments, the cauterization process of block 640 may involve simultaneously cutting the insulation blanket to form the exposed edge. The process of block 640 may be performed with a high temperature laser. In other embodiments, the process of block 640 may be performed by exposing the exposed edge of the insulation blanket to a flame. In some embodiments, the method 600 may also include installing the insulation blanket on or about an object to be insulated.

Having described several examples, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Additionally, details of any specific example may not always be present in variations of that example or may be added to other examples.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the glass fiber" includes reference to one or more glass fibers and equivalents thereof known to those skilled in the art, and so forth. The invention has now been described in detail for the purposes of clarity and understanding. However, it will be appreciated that certain changes and modifications may be practice within the scope of the appended claims.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. An insulation blanket for insulating a structure comprising:
   a first facer layer;
   a second facer layer;
   a plurality of intermeshed non-woven glass fibers disposed between the first and second facer layers; and
   a fumed silica insulating powder disposed between the first and second facer layers and within the intermeshed non-woven glass fibers, the fumed silica insulating powder having an average particle size of between about 2 and 20 nanometers;
   wherein the insulation blanket includes at least one exposed edge having a cauterized face that is roughly orthogonal to the first and second facer layers, the cauterized face comprising fumed silica insulating powder and glass fibers that are melted and recrystallized to form a barrier on the exposed edge that encases the fumed silica insulating powder within the interior of the insulation blanket thereby minimizing degradation of the insulating value due to loss or shedding of the fumed silica insulating powder through the exposed edge, the cauterized edge having a depth of cauterized material of between about 0.05 and 3 mm.

2. The insulation blanket of claim 1, wherein at least 80% of the exposed edge is cauterized, but less than the entire exposed edge is cauterized.

3. The insulation blanket of claim 2, wherein at least 90% of the exposed edge is cauterized, but less than the entire exposed edge is cauterized.

4. The insulation blanket of claim 1, wherein the cauterized face forms a plurality of cauterized layers between the first and second facers.

5. The insulation blanket of claim 1, wherein either or both the first facer or the second facer is a woven glass mat facer.

6. The insulation blanket of claim 1, wherein the insulation blanket includes a plurality of exposed edges, and wherein each exposed edge has a cauterized face that forms a barrier that encases the fumed silica insulating powder within the interior of the insulation blanket.

7. An insulation blanket for insulating a structure comprising:
   a plurality of intermeshed non-woven fibers disposed between a first facer and a second facer; and
   a fine insulating powder disposed between the first and second facers and within the intermeshed non-woven fibers;
   wherein the insulation blanket includes at least one exposed edge having a cauterized face comprising melted and recrystallized insulating powder and fibers that forms a barrier on the exposed edge to encase the fine insulating powder within the interior of the insulation blanket thereby minimizing loss of the fine insulating powder through the exposed edge; and
   wherein the exposed edge has a depth of cauterized material of between about 0.05 and 3 mm.

8. The insulation blanket of claim 7, wherein at least 80% of the exposed edge is cauterized, but less than the entire exposed edge is cauterized.

9. The insulation blanket of claim 8, wherein at least 90% of the exposed edge is cauterized, but less than the entire exposed edge is cauterized.

10. The insulation blanket of claim 7, wherein the exposed edge has a plurality of cauterized layers between the first and second facers.

11. The insulation blanket of claim 7, wherein either or both the first facer or the second facer is a woven glass mat facer.

12. The insulation blanket of claim 7, wherein the fine insulating powder includes fumed silica.

13. The insulation blanket of claim 7, wherein the insulation blanket includes a plurality of exposed edges, and wherein each exposed edge has a cauterized face that forms a barrier to encase the fine insulating powder within the interior of the insulation blanket.

* * * * *